Figure 1:
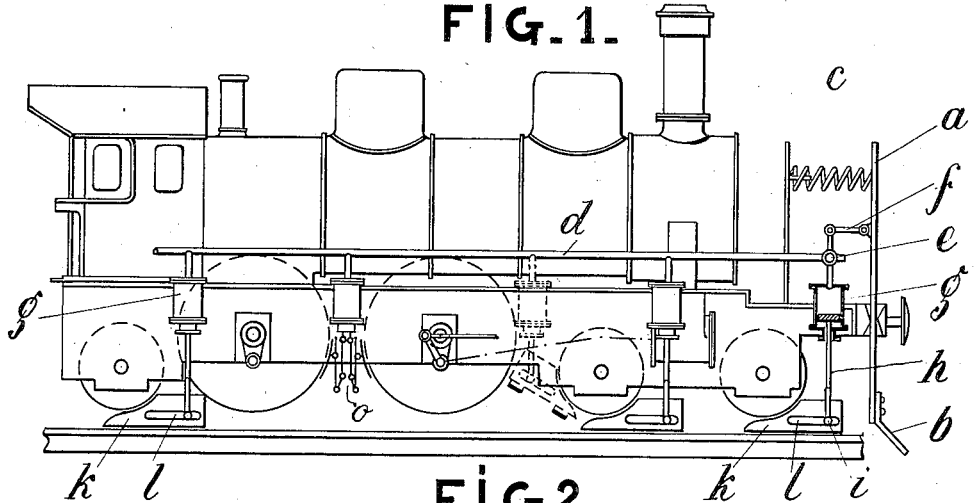

No. 893,489. PATENTED JULY 14, 1908.
B. DE HALMY.
AUTOMATIC VEHICLE STOPPING DEVICE.
APPLICATION FILED NOV. 8, 1907.

Witnesses:

Inventor:
Béla de Halmy
by Georgie & Massie
his Attorneys

UNITED STATES PATENT OFFICE.

BÉLA DE HALMY, OF DIOS-GYÖR, AUSTRIA-HUNGARY.

AUTOMATIC VEHICLE-STOPPING DEVICE.

No. 893,489.   Specification of Letters Patent.   Patented July 14, 1908.

Application filed November 8, 1907. Serial No. 401,340.

*To all whom it may concern:*

Be it known that I, BÉLA DE HALMY, a citizen of the Kingdom of Hungary, and residing at Dios-Györ, Austria-Hungary, have invented certain new and useful Improvements in Automatic Vehicle-Stopping Devices, of which the following is a full, clear, and exact description.

This invention relates to a device which may be arranged on all kinds of vehicles, e. g. locomotives, electrically driven carriages etc., and automatically stops the vehicle if the same collides with any obstacle or human beings, animals or the like or if the switches are not in the right position ("half position").

The essence of the invention consists in a plate or fender which is so movably arranged at the front of an engine or other vehicle that when it collides with an obstacle wedge-shaped shoes or blocks are released which fall on to the rails in front of the wheels. The wheels run up the ascending inclined surfaces of the blocks and raise the vehicle so that the coupled wheels run idly in the air and no longer participate in the propulsion of the vehicle. The blocks or shoes arranged in front of the wheels are generally suspended at a suitable distance above the rails by means of rods connected with the push plate (or net) and are only released and dropped on to the rails if the plate is moved by its collision with an obstacle and releases the blocks by moving the rods connected with the plate.

In engines which are provided with air brakes the blocks are best connected with the piston rods of the brake cylinder which hold the blocks in the raised position while the vehicle is in motion, and on commencement of the braking action the blocks are dropped on to the rails. The push plate (or net) is connected in this case with a cock or valve of the air conduit in such a manner that on the collision of the plate with an obstacle and the consequent actuation of same, this valve or cock is opened and consequently the cylinder pistons are moved in such a manner that the blocks fall on to the rails and so raise the engine whereby the air brake is simultaneously actuated and so also coöperates in stopping the train.

In locomotives or vehicles which have only coupled wheels the latter run up the blocks, or a roller running on the rails is arranged in front of these wheels, which roller on collisions or the like runs on the falling blocks.

The plate movably suspended at the front end of the vehicle has two arms directed downwards which are arranged at such a distance from the inside of the rails that the same are not impeded in their forward movement by the switch if the tongue or sliding rail lies closely against the main rail or if the switch is quite open, while if the switch is in an intermediate position, e. g. "half-position" the one arm strikes against the tongue and thereby displaces the plate in such a manner that the blocks are released and so fall on to the rails.

The drawing shows the subject matter of the invention as applied to an engine provided with a vacuum air brake. It is however obvious that the device cannot only be applied in the manner illustrated and only to locomotives but the same may be used for all kinds of vehicles and the various parts of the same may be modified in many respects without altering the real essence of the invention.

Figure 2:
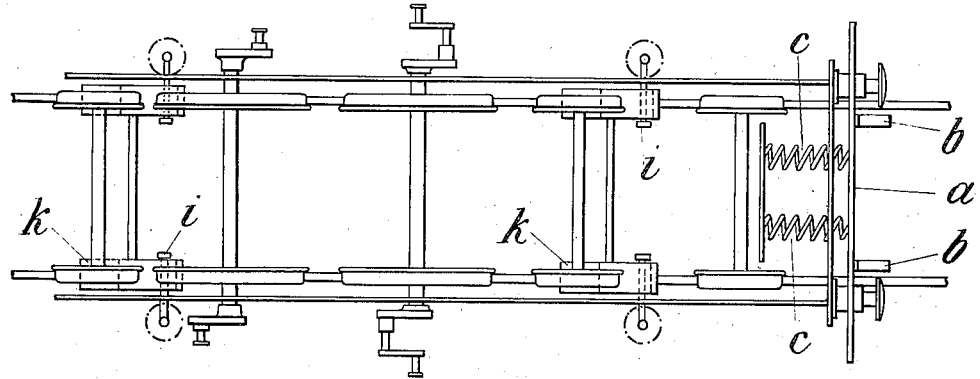
Figure 3:
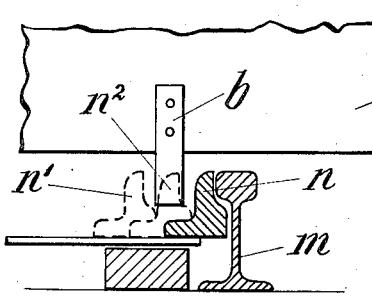
Figure 4:
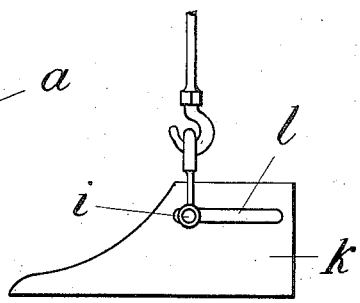

In the accompanying drawings Figure 1 is a side view of an engine provided with the device, Fig. 2 is a plan view, Fig. 3 the cross section of the main rail and the sliding rail of the switch, Fig. 4 is one form of construction of the block suspension.

According to the form of construction illustrated the plate (or net) $a$ is held in a vertical position in front of the vehicle by means of springs $c$ so that the plate, should it come into contact with an obstacle or collide with an engine coming in an opposite direction, may easily recede or yield. The cock or valve $e$ is arranged in a pipe $d$ of the vacuum air brake and is connected with the plate $a$ by means of rods $f$. The cylinders $g$ are connected up in a known manner to the pipe $d$, containing rarefied air since it is in communication with the vacuum chamber of the vacuum air brake and the rods $h$ are fastened to the cylinder pistons, the rods carrying at their lower ends the already mentioned blocks $k$ in front of the wheels. These blocks are preferably wedge-shaped as shown so that the wheels may easily run up the inclined surfaces. The blocks are connected with the rods $h$ by means of pivots $i$ arranged on the latter, which pivots engage in the longitudinal slots $l$ of the blocks and slide in these slots when the wheels mount the blocks or on movement of the wheels. The blocks are arranged on either side of the vehicle and the blocks belonging to the same pair of wheels may be connected with each other by a cross rod, as shown. In order to also obtain a movement of the plate $a$ if the sliding rail is adjusted in such a manner that the tongue does not come to lie closely against the main rail, two arms $b$ directed downwards are arranged on the plate, which arms are at such a distance from the inner side edges of the rails that if the points are correctly adjusted, viz: If the tongue $n$ (Fig. 3) lies against the main rail $m$ or if the tongue is quite open in the position $n^1$ the same may pass by the tongue or between the main rail and sliding rail unimpeded, while if the tongue is in an intermediate position $n^2$ the arms come into contact with the tongue and by moving the plate $a$ stop the vehicle.

According to the form of construction shown in Fig. 4 the lower end of the carrying rod of the block is hook-shaped to engage with a shackle or the like on the pivot $i$ so that the supporting rod consists in this case of two movably connected parts and so is less subject to breakage, as the pivot $i$ owing to the yielding power of the rod can move easily in slot $l$.

The mode of action of the device may easily be understood from the above. As soon as the plate $a$ comes into contact with an obstacle or collides with a train coming in the opposite direction, it yields against the action of the spring $c$ and opens the cock or valve $e$ of the air pipe $d$, the said pipe $d$ normally containing rarefied air since the lower face of the piston in the cylinder $g$ is exposed to atmospheric pressure. The cylinder being in communication with the outer air at the lower end of the cylinder, the said piston will be forced upward to the upper end of the cylinder. The pistons of the cylinders $g$ generally keep the blocks $k$ raised while the train is in motion, when however applying the brakes or when opening the cock $e$ the outer air is admitted into the cylinder, $g$, above the piston whereby equilibrium is established between the pressure on the upper and lower faces of the piston whereby they are displaced in such a manner that the blocks are dropped on the rails in front of the wheels. Although at the same time the brake $o$ of the coupled wheels comes into action the vehicle runs on owing to its *vis viva* and runs up the ascending inclined surfaces of the blocks lying on the rails and is so raised into the air. The blocks do not move on the rails at all or only to a slight extent while the vehicle is mounting the same, for the blocks are tightly pressed against the rails owing to the weight of the vehicle. Consequently the pivots $i$ of the supporting rods $h$ will move forward in the slots $l$ of the blocks. If the sliding rail is in an intermediate position the movement of the plate and the stopping of the train are effected in the described manner by the tongue $n^2$ when in the intermediate position (Fig. 3) against which the one or the other of the arms $b$ arranged on the plate and directed downwards strikes.

In vehicles without air brakes the blocks $k$ are suitably kept in the raised position by means of spring hooks or the like, which are connected with the plate and when the latter is displaced are released so as to drop the blocks.

The device described may naturally not only be applied to the engine, but also to some or all the carriages of the train in which case the whole of the train is raised up into the air when a collision takes place or if the switches are not correctly adjusted.

The device may further be used in combination with air pressure or vacuum brakes of any suitable construction as well as with any type of brakes without departing from the scope of the invention.

What I claim and desire to secure by Letters Patent is:—

1. In a vehicle stopping device, a wedge-shaped block arranged above the rails in front of a wheel of the vehicle, in combination, with a cylinder, the upper part of which is connected with the vacuum chamber, a cock for controlling the communication of the said cylinder with the vacuum chamber, a piston within said cylinder and connected to the wedge-shaped blocks, and a tripping device for operating said cock arranged on the vehicle to strike an obstacle interposed in the path of the said vehicle.

2. In a device for stopping vehicles, a wedge-shaped block arranged in front of a wheel of the vehicle, a cylinder and a piston in the same, and means for suspending the wedge-shaped block connected with said piston, in combination with means for increasing the pressure on one face of the piston when the vehicle collides with an obstacle.

3. In a device for stopping vehicles, a wedge-shaped block arranged in front of a wheel of the vehicle, a cylinder and a piston in the same, and a rod depending from said piston and connected to the wedge-shaped block, the cylinder being in communication with the atmosphere at the bottom and in communication with a vacuum chamber at its upper end, in combination with means for simultaneously cutting off said communication with a vacuum and establishing communication with the atmosphere, and a tripper adapted to operate said means on collision with an obstacle.

4. In a device for stopping vehicles, wedge-shaped blocks suspended by means of rods in front of the wheels above the rails, said rods being provided at their lower ends with pivots engaging in longitudinal slots of the blocks which fall on to the rails when the vehicle collides with an obstacle.

5. In a device for stopping vehicles with air brakes, wedge-shaped blocks suspended on the piston rods of the brake cylinders and carried in front of the wheels above the rails, said blocks falling on to the rails when the air conduit is opened.

6. In a device for stopping vehicles, movably suspended arms directed downwards at the front end of the vehicle and lying in the track of the sliding switch tongues if incorrectly set, said arms being connected with blocks which fall on to the rails in front of the wheels when the arms collide with the tongues.

7. In a device for stopping vehicles, a plate movably suspended at the front end of the vehicle and provided with arms directed downwards, the lower ends of said arms lying in the track of the sliding switch tongues if incorrectly set, and the plate being connected with blocks which fall on to the rails in front of the wheels when the plate collides with an obstacle or the depending arms strike against the tongues.

8. In a device for stopping vehicles with air brakes, the combination of wedge-shaped blocks suspended on the piston rods of the brake cylinders in front of the wheels, a plate movably supported at the front end of the vehicle, and means to connect the plate with a cock of the air conduit so as to open the latter upon displacement of the plate and to drop the blocks on to the rails simultaneously with the application of the brakes.

9. In a device for stopping vehicles with air brakes, the combination of wedge-shaped blocks suspended on the piston rods of the brake cylinders in front of the wheels, a plate movably supported at the front end of the vehicle and provided with downward directed arms arranged in the track of the sliding switch tongues if incorrectly set, and means to connect the plate with a cock of the air conduit so as to open the latter upon striking of the arms against the tongues and to drop the blocks on to the rails simultaneously with the application of the brakes.

In witness whereof I have hereunto set my hand in presence of two witnesses.

BÉLA DE HALMY.

Witnesses:
   HENRY FENYÖ,
   LESLIE ALSASZ.